United States Patent Office 3,487,153
Patented Dec. 30, 1969

3,487,153
METHOD OF TREATING MENTAL DEPRESSION
Bernard J. Baltes, Evanston, Ill., assignor to Rexall Drug and Chemical Company, Los Angeles, Calif., a corporation of Delaware
No Drawing. Filed Jan. 19, 1968, Ser. No. 699,033
Int. Cl. A61k 27/00
U.S. Cl. 424—244
3 Claims

ABSTRACT OF THE DISCLOSURE

An antidepressant effect is obtained in humans suffering from mental depression by the administration of 5-methyl - 1 - phenyl-1,3,4,6-tetrahydro-5H-benz[f]-2,5-oxazocine.

SPECIFICATION

This invention relates to the treatment of mental depression in humans.

The invention sought to be patented is described as residing in the concept of a process of use comprising the administration to a human suffering from depression of 5-methyl - 1 - phenyl-1,3,4,6-tetrahydro-5H-benz[f]-2,5-oxazocine in a non-toxic amount sufficient to produce an antidepressant effect.

The manner and process of making and using the invention will now be generally described so as to enable one skilled in the art to make and use the same as follows.

The active constituent in the process of use of this invention has the following structural formula:

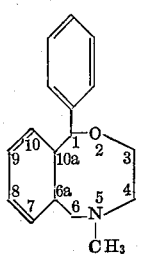

and is prepared as follows:

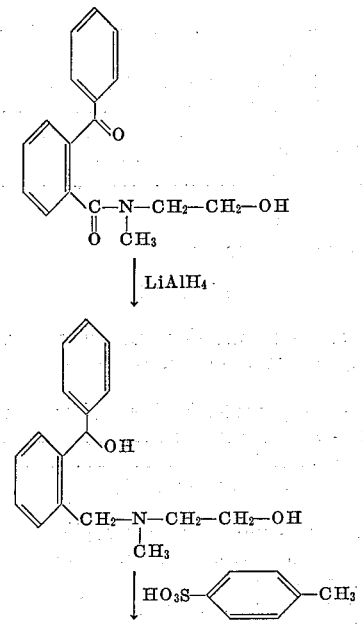

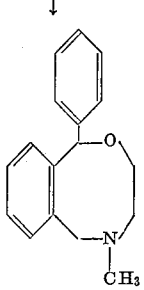

The N-(2-hydroxyethyl)-N-methyl-o-benzoylbenzamide starting material is readily prepared from o-benzoylbenzamide by treatment with thionyl chloride to form the acid chloride which is treated with N-methyl-2-aminoethanol. In the above depicted reaction sequence the started material is reduced by treatment with lithium aluminum hydride and the product of the reduction is cyclized in a reaction involving removal of a molecule of water with an acid dehydration catalyst such as p-toluenesulfonic acid.

Starting materials in which the methyl radical linked to the amino nitrogen atom is replaced by hydrogen or by a lower alkyl radical other than methyl and/or starting material in which either or both phenyl groups are substituted with one or more lower alkyl, lower alkoxy, halo or trifluoromethyl radicals can be used in the above depicted reaction sequence to prepare similarly substituted final products which are the full equivalents of 5-methyl-1-phenyl-1,3,4,6-tetrahydro-5H-benz[f] - 2,5 - oxazocine in the process of use of this invention.

The active constituent 5-methyl-1-phenyl-1,3,4,6-tetrahydro-5H-benz[f]-2,5-oxazocine and its above described equivalents have a cyclic amino nitrogen atom and thus are amenable to formation of pharmaceutically acceptable acid addition and quaternary ammonium salts. Exemplary of such acid addition salts are those formed with inorganic acids such as the hydrochloride, hydrobromide, hydroiodide, sulfate and phosphate and with organic acids such as the acetate, propionate, citrate, tartrate, malate and maleate. Exemplary of such quarternary ammonium salts are those formed with alkyl halides such as the methyl iodide and n-hexylbromide. Such pharmaceutically acceptable salts are the full equivalents of the bases from which they are derived in the process of use of this invention.

In accordance with the process of use of this invention, 5-methyl - 1 - phenyl - 1,3,4,6 - tetrahydro-5H-benz[f]-2,5-oxazocine is administered to a human suffering depression in a non-toxic amount sufficient to produce an antidepressant effect. The process of this invention is applicable to humans suffering from a wide variety of mentally depressed states, including psychoneurotic depression with or without anxiety, involutional melancholia and reactive depression, but excluding psychotic depression. Target symptoms in the patient include anxiety, depressed mood, insomia, psychomotor retardation, loss of interest and feelings of guilt. An antidepressant effect is manifest by the patient showing a greater interest in his surroundings and an increasing elevation of mood.

The individual unit dose and frequency of administration is determined not only by the nature and severity of the patient's depression, but also upon the patient's age, weight and underlying physical condition and the route of drug administration. Depressed states vary from patient to patient as does any patient's response to a particular type of therapy. Thus, therapy must be individualized and it will be within the professional judgment and skill of the practitioner administering the drug to determine the dosage regimen such as to be non-toxic yet sufficient to produce an anti-depressant effect in the patient. Effective therapy has been obtained in adults by the daily oral administration of 30 to 180 milligrams divided into 3 or 4 administrations per day. The oral route is generally preferred due to patient acceptance, but in some cases the parenteral route is necessary where rapid control of symptoms is indicated or where the patient is unable or refuses to take oral medication. Due to greater absorption of the drug upon parenteral administration, the unit and daily parenteral dosage is lower than in the case of the oral route.

In carrying out the process of use of the invention, the active constituent 5 - methyl-1-phenyl-1,3,4,6-tetrahydro-5H-benz[f]-2,5-oxazocine is incorporated with conventional pharmaceutical diluents and carriers to form such dosage forms as tablets, capsules, solutions, suspensions, suppositories and the like. Such formulations can also includes other therapeutically active ingredients where an additional therapeutic effect is desired.

The best mode contemplated by the inventor for carrying out his invention will now be set forth as follows:

EXAMPLE 1

(I) Preparation of active constituent (a) 2 - {[N - (2 - hydroxyethyl)-N-methyl]amino}methylbenzhydrol.—N - (2 - hydroxyethyl)-N-methyl-o-benzoylbenzamide (20.0 g., 0.07 mole) is suspended in tetrahydrofuran (100 ml.) and then slowly added in small portions to a solution of lithium aluminum hydride (5.5 g., 0.14 mole) in tetrahydrofuran (150 ml.) with cooling and stirring. The mixture is then refluxed for 18 hours, cooled and then to it is successively added water (5.5 ml.), 3.75 N sodium hydroxide (5.5 ml.) and water (16 ml.). After removal of precipitated salts by filtration, the solution remaining is concentrated under reduced pressure and the residue dried to yield 19.5 g. of crude product. Yield after conversion to the hydrochloride salt and recrystallization is 17.0 g. (89%), M.P. 128°–133° C.

Analysis.—Calculated for $C_{17}H_{22}NO_2Cl$: C, 66.32%; H, 7.20%; N, 4.55%; Cl, 11.52%. Found: C, 66.50%; H, 7.13%; N, 4.42%; Cl, 11.49%.

(b) 5 - methyl - 1 - phenyl - 1,3,4,6-tetrahydro-5H-benz[f] - 2,5 - oxazocine.—2-{[N-(2-hydroxyethyl)-N-methyl]amino}methylbenzhydrol (3.0 g., 0.011 mole), prepared as described above in step (a), p-toluenesulfonic acid (3.0 g.) and benzene (15 ml.) are heated together with stirring until all the benzene is distilled off. The residual oil is heated to 105° C. and held at this temperature for 1 hour, then cooled and dissolved in water (30 ml.). This aqueous solution is then basified to pH 10.0 with 12 N sodium hydroxide, extracted with ether, and the ether extracts washed with water, dried over anhydrous sodium sulfate and the solvent removed under reduced pressure. The oil remaining (2.26 g., 81%) is converted to the hydrochloride salt, M.P. 238°–242° C.

Analysis.—Calculated for $C_{17}H_{20}NOCl$: C, 70.45%; H, 6.96%; N, 4.83%; Cl, 12.24%. Found: C, 70.51%; H, 6.67%; N, 5.02%; Cl, 12.00%.

(II) Preparation of dosage form

Using conventional granulation and tablet formation techniques, tablets were prepared having the following composition:

| | Mg./tablet |
|---|---|
| 5 - methyl - 1 - phenyl-1,3,4,6-tetrahydro-5H-benz[f]-2,5-oxazocine HCl | [1] 34.32 |
| Calcium sulfate dehydrate | 250.68 |
| Starch | 45.00 |
| Gelatin | 4.0 |
| Magnesium stearate | 4.0 |
| | 338.0 |

[1] Equivalent to 30 mg. of base.

(III) Data relative to safety of 5-methyl-1-phenyl-1,3,4,6-tetrahydro-5H-benz[f]-2,5-oxazocine

| $LD_{50}$ in mice: | Mg./kg. |
|---|---|
| I.p. | 70 |
| Oral | 119 |
| I.v. | 44.5 |
| $LD_{50}$ in rats: | |
| Oral | 178 |
| I.v. | 28 |

SUBACUTE TOXICITY IN DOGS—ORAL

Dogs were administered the drug at 4, 10, 20 and 80 mg./kg.-day for 37 days orally. Gross and microscopic evaluation showed these doses to be well tolerated with no drug related abnormalities observed.

SUBACUTE TOXICITY IN DOGS—I.V.

Dogs were administered the drug at 1 and 5 mg./kg-day for 30 days i.v. These doses were well tolerated with no evidence of toxicity.

SUBACUTE TOXICITY IN RATS—ORAL

Rats were administered the drug at 20 and 80 mg./kg.-day for 33 days, orally. These doses were well tolerated with no drug related abnormalities or toxicity noted.

(IV) Use in treatment of depression

A 56-year-old female with a long history of mental depression and a confirmed diagnosis of reactive depression received 1 week of placebo therapy with no improvement. Starting with week 2 and contiuning through week 5 she received 30 mg. of 5-methyl-1-phenyl-1,3,4,6-tetrahydro-5H-benz[f]-2,5-oxazocine three times each day (90 mg./day), the drug being administered in the form of tablets formulated as described in subsection (II) of this example. The drug was well tolerated with improvement in symptoms noted at the end of the first week on active medication (week 2). Improvement had progressed to such a degree by the end of week 3 that she was able to return to work and she remained free of symptoms of depression during the course of therapy. The patient was switched back to placebo at the start of week 6 and suffered a relapse with symptoms of depression again becoming manifest.

The following examples are exemplary of other dosage forms useful in the process of use of this invention:

EXAMPLE 2

Capsules, were prepared, each containing:

| | Mg. |
|---|---|
| 5-methyl - 1 - phenyl - 1,3,4,6-tetrahydro-5H-benz[f]-2,5-oxazocine HCl | [1] 11.44 |
| Lactose | 265.69 |
| F.D. & C. Red No. 2 Lake | 0.07 |
| Magnesium stearate | 2.80 |
| | 280.0 |

[1] Equivalent to 10 mg. base.

EXAMPLE 3

An injectable formulation was prepared and filled into 2 ml. ampules, each ampule containing:

| | Mg. |
|---|---|
| 5-methyl - 1 - phenyl-1,3,4,6-tetraphydro-5H-benz[f] - 2,5 - oxazocine | 20 |
| Propylene glycol, U.S.P. | 11.3 |
| $H_2O$ for injection, q.s. to 1.00 ml. | |

The subject matter which the applicant regards as his invention is particularly pointed out and distinctly claimed as follows:

1. A method of treating mental depression in humans suffering depression which comprises administering to said humans 5-methyl-1-phenyl-1,3,4,6-tetrahydro-5H-benz[f]-2,5-oxazocine in a non-toxic amount sufficient to produce an antidepressant effect.

2. A method according to claim 1 wherein the route of administration is oral.

3. A method according to claim 1 wherein the route of administration is parenteral.

References Cited

UNITED STATES PATENTS 2,807,628  9/1957   Belleau _____ 260—331
3,152,145  10/1964  Sulkowski _____ 260—331

ALBERT T. MEYERS, Primary Examiner
STANLEY J. FRIEDMAN, Assistant Examiner